(12) United States Patent
Ishikawa et al.

(10) Patent No.: US 10,335,744 B2
(45) Date of Patent: Jul. 2, 2019

(54) METHOD OF PRODUCING FLAT SHEET MEMBRANE ELEMENT AND FLAT SHEET MEMBRANE ELEMENT

(71) Applicant: Kubota Corporation, Osaka-shi, Osaka (JP)

(72) Inventors: Kimihiro Ishikawa, Hyogo (JP); Yasuyuki Okada, Hyogo (JP)

(73) Assignee: Kubota Corporation, Osaka-shi, Osaka (JP)

( * ) Notice: Subject to any disclaimer, the term of this patent is extended or adjusted under 35 U.S.C. 154(b) by 304 days.

(21) Appl. No.: 15/129,997

(22) PCT Filed: Mar. 13, 2015

(86) PCT No.: PCT/JP2015/057412
§ 371 (c)(1),
(2) Date: Sep. 28, 2016

(87) PCT Pub. No.: WO2015/151762
PCT Pub. Date: Oct. 8, 2015

(65) Prior Publication Data
US 2017/0239625 A1   Aug. 24, 2017

(30) Foreign Application Priority Data
Mar. 31, 2014  (JP) .................. 2014-071220

(51) Int. Cl.
*B01D 69/12* (2006.01)
*B01D 69/06* (2006.01)
(Continued)

(52) U.S. Cl.
CPC ......... *B01D 69/122* (2013.01); *B01D 63/081* (2013.01); *B01D 63/082* (2013.01);
(Continued)

(58) Field of Classification Search
CPC ..... B01D 69/122; B01D 69/06; B01D 63/081
See application file for complete search history.

(56) References Cited

U.S. PATENT DOCUMENTS

| | | | |
|---|---|---|---|
| 3,272,674 A | 9/1966 | Sachs et al. | 156/282 |
| 5,651,888 A | 7/1997 | Shimizu et al. | 210/321.64 |

(Continued)

FOREIGN PATENT DOCUMENTS

| | | |
|---|---|---|
| CN | 101980764 A | 2/2011 |
| CN | 103269780 A | 8/2013 |

(Continued)

OTHER PUBLICATIONS

International Search Report from corresponding International Patent Application No. PCT/JP2015/057412, dated May 19, 2015.

(Continued)

*Primary Examiner* — Krishnan S Menon
*Assistant Examiner* — Waqaas Ali
(74) *Attorney, Agent, or Firm* — Kusner & Jaffe (57) ABSTRACT

A sheet filter membrane is arranged on a surface of a filter plate of a thermoplastic resin, and a plurality of projections provided in a hot plate is pressed against the filter plate above a periphery of the filter membrane with different timing for each of the projections to abut on the filter membrane. A plurality of recessed bonding portions with different depths are thus formed in the filter plate, and the filter membrane is bonded to the filter plate by heat welding in each of the recessed bonding portions. Sealing is therefore provided between the filter membrane and the filter plate along the periphery of the filter membrane.

5 Claims, 8 Drawing Sheets

(51) Int. Cl.
*C02F 3/12* (2006.01)
*B01D 63/08* (2006.01)
*B01D 65/00* (2006.01)

(52) U.S. Cl.
CPC ........... *B01D 65/003* (2013.01); *B01D 69/06* (2013.01); *C02F 3/1268* (2013.01); *B01D 2313/04* (2013.01); *B01D 2313/14* (2013.01); *B01D 2323/42* (2013.01); *Y02W 10/15* (2015.05)

(56) References Cited

U.S. PATENT DOCUMENTS

| | | | |
|---|---|---|---|
| 6,287,467 B1 | 9/2001 | Nagano et al. | 210/321.84 |
| 7,776,214 B2 | 8/2010 | Saito et al. | 210/231 |
| 2008/0251440 A1* | 10/2008 | Saito | B01D 63/081 210/230 |
| 2011/0005994 A1 | 1/2011 | Masutani et al. | |
| 2013/0299412 A1 | 11/2013 | Masutani et al. | |

FOREIGN PATENT DOCUMENTS

| | | | | |
|---|---|---|---|---|
| EP | 2 985 070 A1 | 2/2016 | | B01D 6/00 |
| JP | 03014476 A * | 1/1991 | | |
| JP | H 0724270 A | 1/1995 | | B01D 63/00 |
| JP | 2001-120959 A | 5/2001 | | B01D 63/00 |
| JP | 3778758 B2 | 3/2006 | | B01D 63/00 |
| JP | 2011-189327 A | 9/2011 | | B01D 63/00 |
| JP | 5079984 B2 | 9/2012 | | B01D 63/00 |

OTHER PUBLICATIONS

Office Action issued in corresponding Chinese Patent Application No. 201580017859.6 dated Apr. 28, 2018.

Extended European Search Report issued in corresponding European Patent Application No. 15 77 4485 dated Oct. 16, 2017.

* cited by examiner

METHOD OF PRODUCING FLAT SHEET MEMBRANE ELEMENT AND FLAT SHEET MEMBRANE ELEMENT

FIELD OF THE INVENTION

The present invention relates to a flat sheet membrane element of a submerged type membrane separator used for membrane bioreactor (MBR) and specifically to a technique of bonding a filter membrane to a filter plate.

BACKGROUND OF THE INVENTION

As an example of a conventional production method, Japanese Patent No. 5079984 discloses a method of producing a sheet membrane element, wherein the method includes bonding a microporous filter membrane to the periphery of a filter plate of a thermoplastic resin. The microporous filter membrane having micropores is supported on a nonwoven fabric composed of synthetic resin fiber. In this production method, the microporous filter membrane and the periphery of the filter plate composed of a thermoplastic resin are bonded together at or lower than the deflection temperature under load of the nonwoven fabric acting as a support by a hot plate whose temperature is controlled at a temperature not less than Vicat softening temperature of the thermoplastic resin filter plate. In this production method, the microporous filter membrane is bonded to the thermoplastic resin filter plate by forming a recess in the periphery of the thermoplastic resin filter plate and drawing the microporous filter membrane in the recess. The production method is performed such that the synthetic resin fiber has a cross-sectional shape at the bottom of the recess not changing with respect to the cross-sectional shape of the synthetic resin fiber at the edge of the recess.

In a method of producing a submerged type flat sheet membrane element disclosed in Japanese Patent No. 3778758, a plurality of linear melting regions and a mesh melting region that is positioned outside the linear melting regions are formed in a resin filter plate so as to project from a surface of the filter plate along the periphery of the filter plate. In this production method, a filter membrane is arranged over the surface of the filter plate to cover each linear melting region and the mesh melting region. A flat surface of an up-down horn is pressed against each linear melting region and the mesh melting region above the filter membrane to weld the filter membrane in each linear melting region and the mesh melting region by vibration of the up-down horn.

The filter membrane is then kept in tension by a linear internal fixation area formed in the internal linear melting region. The entire perimeter of the filter membrane is securely provided with a watertight function by a watertight area formed in the central linear melting region. The periphery of the filter membrane is intermittently fixed to the filter plate by a mesh fixation area formed in the external mesh melting region. The mesh melting region is formed at a different level from the linear melting regions for welding in the mesh melting region separately from the linear melting regions respectively on both sides of the filter plate.

SUMMARY OF INVENTION

Technical Problem

Japanese Patent No. 5079984 is configured to enable bonding by forming a recess in a filter plate composed of a thermoplastic resin by a hot plate and drawing a microporous filter membrane in the recess, leading to provide the microporous filter membrane in tension. Unfortunately, the periphery of the microporous filter membrane in an area protruding outside from the recess is not bonded to the filter plate. The peripheral area has a problem of swinging due to flows, such as aeration flows, in a treatment tank and affecting the bonded portion of the microporous filter membrane and the thermoplastic resin filter plate in the recess to cause separation, breaking, and the like.

The microporous filter membrane drawn in the recess has the periphery protruding outside from the recess in the free state. Deformation of the filter membrane by the drawing of the microporous filter membrane in the recess thus causes wrinkles in the periphery of the microporous filter membrane. It is therefore difficult to eliminate the wrinkles already formed in the periphery of the microporous filter membrane for bonding even by bonding the microporous filter membrane to the thermoplastic resin filter plate in a line of recess by a hot plate for single sealing of the microporous filter membrane and the thermoplastic resin filter plate and then further bonding the periphery of the microporous filter membrane to the thermoplastic resin filter plate in a post-processing. The wrinkles may cause the problem of separation, breaking, and the like due to flows, such as aeration flows, in a treatment vessel.

Japanese Patent No. 3778758 is configured to weld the filter membrane in the internal linear melting region, the central linear melting region, and the mesh melting region and to project the internal linear melting region, the central linear melting region, and the mesh melting region from the surface of the filter plate. The welding operation does not act to tightly contact the filter membrane and the surface of the filter plate over the entire region of the filter membrane. Naturally, while the flat sheet membrane element is exposed to an upward flow associated with aeration in the treatment tank, the flat sheet membrane element vibrates. The vibration causes swelling of the filter membrane from the filter plate and sticking of the filter membrane to the filter plate, which increase bending stress in the welded areas of the filter membrane and tend to cause a problem of breaking or separation of the membrane.

In view of the above problems, it is an object of the present invention to provide a method of producing a flat sheet membrane element and a flat sheet membrane element that enable extension of a filter membrane on a filter plate in tension for welding and enable smooth spread of an outer periphery of the filter membrane for welding to the filter plate.

Solution to Problem

To solve the above problems, a method of producing a flat sheet membrane element of the present invention includes: arranging a sheet filter membrane on a surface of a filter plate of a thermoplastic resin; and pressing a plurality of projections provided in a hot plate against the filter plate above a periphery of the filter membrane with different timing for each projection to abut on the filter membrane; thereby bonding by forming a plurality of recessed bonding portions with different depths in the filter plate and by heat welding the filter membrane to the filter plate in each recessed bonding portion; and sealing between the filter membrane and the filter plate along the periphery of the filter membrane.

In the method of producing a flat sheet membrane element of the present invention, the plurality of recessed bonding portions are formed by pressing the plurality of projections, having different levels, of the hot plate against a flat filter plate surface.

In the method of producing a flat sheet membrane element of the present invention, the plurality of projections of the hot plate form multiple continuous objects along an outer peripheral shape of the filter membrane, the plurality of recessed bonding portions are multiply formed along the periphery of the filter membrane in one operation of pressing the hot plate, and sealing is provided between the filter membrane and the filter plate simultaneously in the plurality of recessed bonding portions.

In the method of producing a flat sheet membrane element of the present invention, the plurality of projections of the hot plate are formed multiply along an outer peripheral shape of the filter membrane at a higher level inside compared with a level outside, and the plurality of recessed bonding portions are formed multiply along the periphery of the filter membrane with a deeper depth inside compared with a depth outside.

In the method of producing a flat sheet membrane element of the present invention, the plurality of projections of the hot plate are formed at different levels where a higher level has in a greater pressing area abutting on the filter membrane per unit length, and the plurality of recessed bonding portions are formed with different depths where a deeper depth results in a greater welding area between the filter membrane and the filter plate per unit length.

In the method of producing a flat sheet membrane element of the present invention, the plurality of projections of the hot plate formed multiply along an outer peripheral shape of the filter membrane at different levels are caused to abut on the filter membrane sequentially from an internal projection to an external projection, and then the periphery of the filter membrane is multiply pressed by the entire projections, while the filter membrane is kept in tension, the plurality of projections are pressed in the filter plate in one pressing operation to form the plurality of recessed bonding portions simultaneously and multiply along the periphery of the filter membrane, and sealing is provided between the filter membrane and the filter plate.

A flat sheet membrane element of the present invention includes: a filter plate of a thermoplastic resin, the filter plate having a plurality of recessed bonding portions multiply formed along a periphery of the plate; and a sheet filter membrane, wherein the filter membrane is bonded to a surface of the filter plate in the recessed bonding portions by heat welding and each recessed bonding portion has a different depth from a surface of the filter membrane.

In the flat sheet membrane element of the present invention, the plurality of recessed bonding portions are formed with a deeper depth inside compared with a depth outside.

In the flat sheet membrane element of the present invention, the plurality of recessed bonding portions are formed to have a greater welding area, with a deeper depth, between the filter membrane and the filter plate per unit length.

Advantageous Effects of Invention

As described above, according to the present invention, the sheet filter membrane is pressed in the filter plate by the projections of the hot plate to form the recessed bonding portions, thereby bonding the filter membrane to the filter plate by heat welding. The invention thus acts to provide tight contact between the filter membrane and the surface of the filter plate over the entire region of the filter membrane. Accordingly, even while the flat sheet membrane element is exposed to an upward flow in the treatment tank, vibration of the filter membrane caused by vibration of the flat sheet membrane element does not easily occur.

Each projection abuts on the filter membrane with different timing and the load exerted on the hot plate accordingly increases stepwise. It is thus inhibited to exert a high load on the hot plate at a time, allowing reduction in heat capacity and power supply capacity of the hot plate.

Since the filter plate used for the present invention may be a flat filter plate surface, the filter plate has a simple structure.

The filter membrane is bonded to the filter plate simultaneously in the plurality of recessed bonding portions in one operation of pressing the hot plate, the bonding operation is thus simplified.

Among the plurality of projections of the hot plate, a projection at a higher level has a greater pressing area of abutting on the filter membrane per unit length in a direction along the outer peripheral shape of the filter membrane. Among the recessed bonding portions, a portion with a deeper depth has a greater welding area and a recessed bonding portion having a greater welding area starts welding earlier to achieve secure sealability in the recessed bonding portions.

The plurality of projections of the hot plate are caused to abut on the filter membrane sequentially from an internal projection to an external projection, and then the periphery of the filter membrane is multiply pressed by the entire projections, and while the filter membrane is kept in tension, the plurality of projections are pressed in the filter plate in one pressing operation to form the plurality of recessed bonding portions simultaneously and multiply along the periphery of the filter membrane. Such an arrangement enables extension of the filter membrane in tension on the filter plate for welding and smooth spread of the outer periphery of the filter membrane for welding to the filter plate.

DETAILED DESCRIPTION OF THE INVENTION

The following will describe embodiments of the present invention in accordance with the accompanying drawings.

Figure 3:
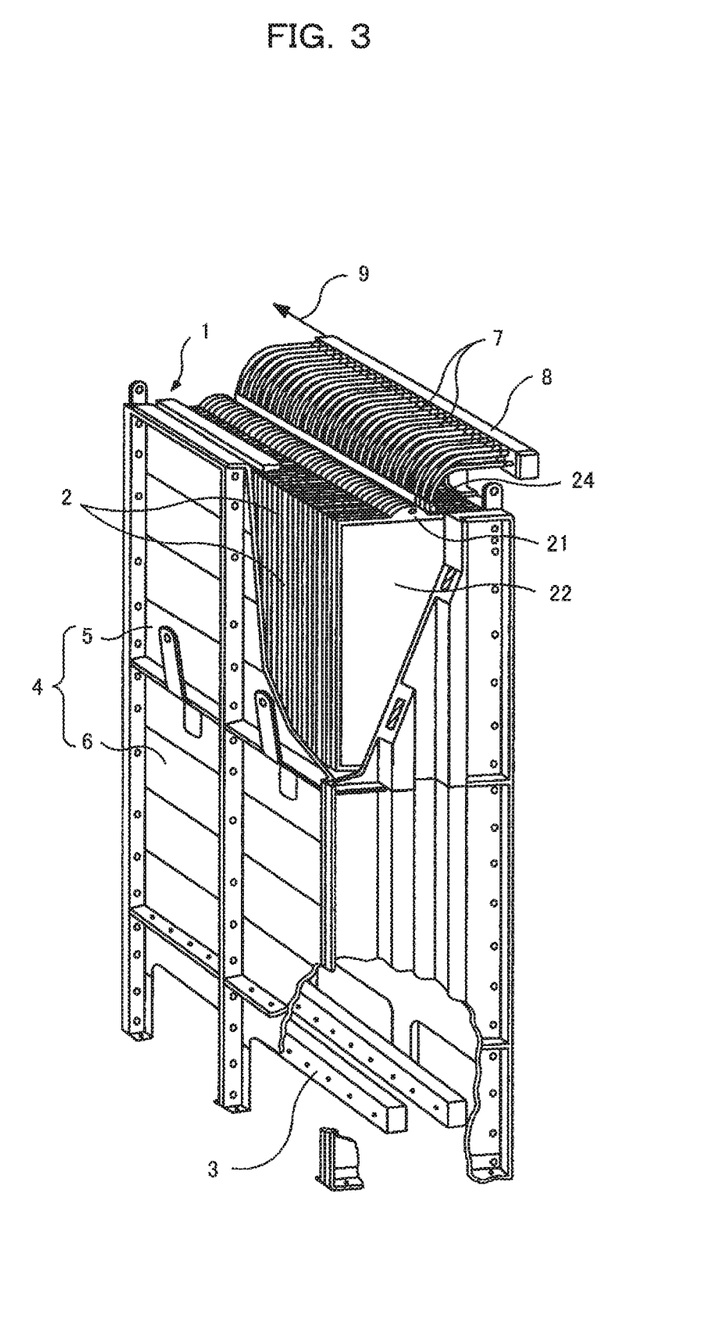
FIG. 3 is a perspective view illustrating a submerged type membrane separator using the sheet membrane element.

As illustrated in FIG. 3, a membrane separator 1 has a plurality of flat sheet membrane elements 2 arranged at regular intervals and air diffusers 3 to blow a membrane surface cleaning gas from below the elements 2 arranged at regular intervals inside a case 4. The case 4 is composed of a membrane case 5 and an air diffuser case 6 and is formed to incorporate the entire amount of the membrane surface cleaning gas to be blown from the air diffusers 3 into the membrane case 5.

To obtain such a flat sheet membrane element 2, organic sheet filter membranes 22 are arranged on both surfaces of a filter plate 21 of a thermoplastic resin, such as an ABS resin. The filter membranes 22 are then bonded to the filter plate 21 in recessed bonding portions 23 in the periphery by welding. Sealing is provided between the filter plate 21 and the filter membranes 22 along the periphery of the filter membranes 22 to obtain the flat sheet membrane element 2. A permeate channel is formed between the filter plate 21 and the filter membranes 22 and inside the filter plate 21, and the permeate channel is in communication with a permeate outlet 24 formed at an upper edge of the filter plate 21.

Each flat sheet membrane element 2 is in communication with a collection pipe 8 via tubes 7 connected to the permeate outlets 24, and the collection pipe 8 is connected to a permeate delivery pipe 9 to deliver the membrane permeate.

Figure 1:
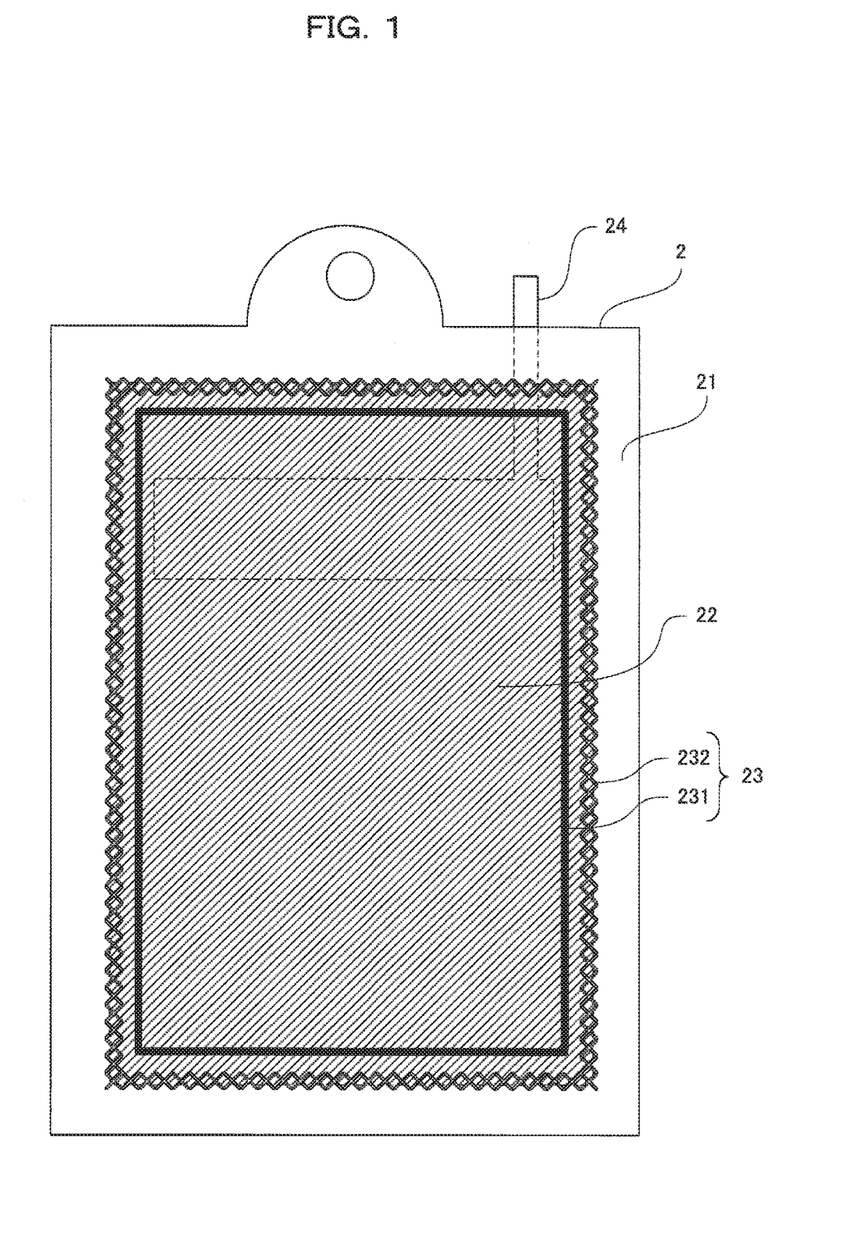
FIG. 1 is a front view illustrating a sheet membrane element in an embodiment of the present invention.
Figure 2:
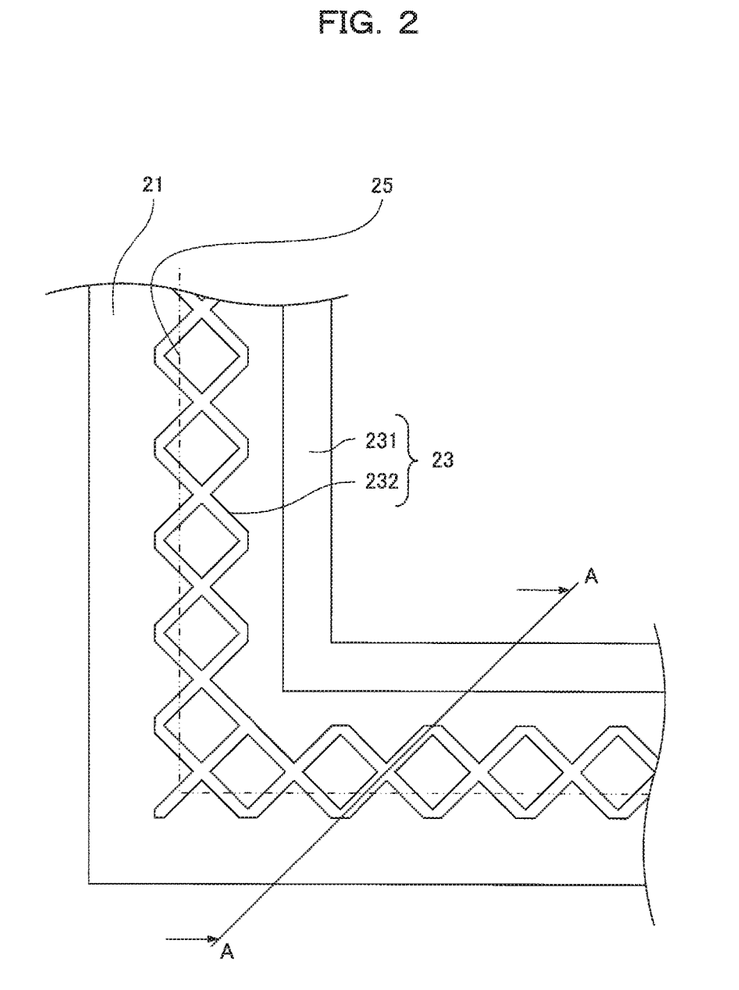
FIG. 2 is a main part enlarged view of the sheet membrane element.
Figure 4:
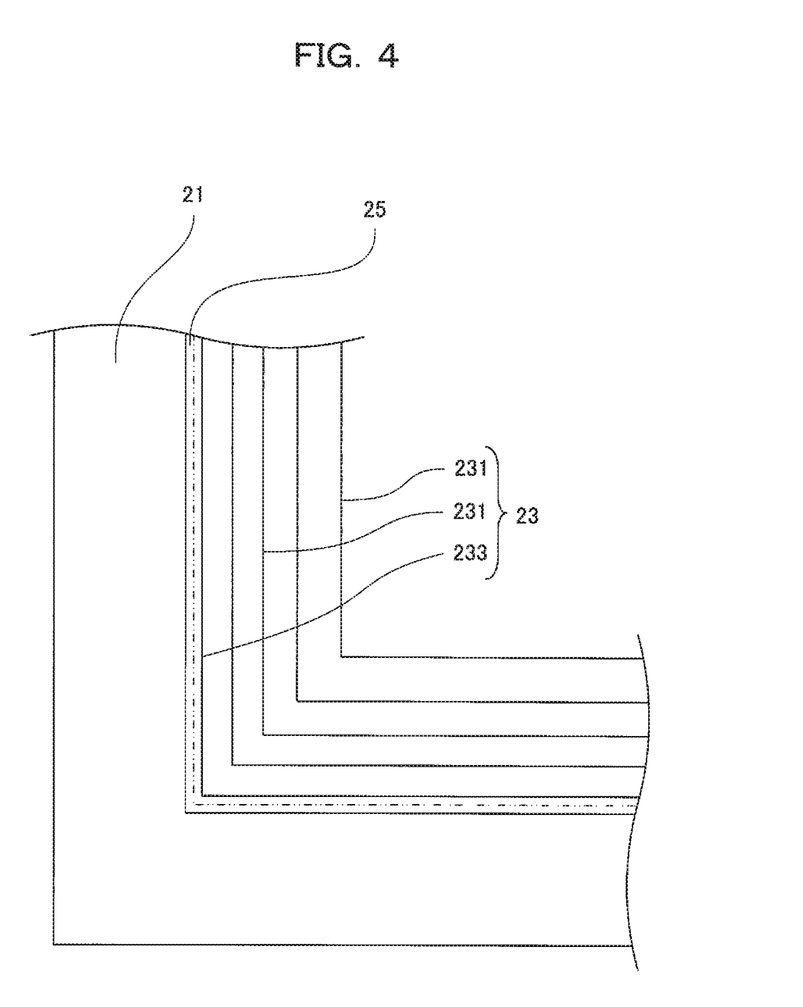
FIG. 4 is a main part enlarged view illustrating a sheet membrane element in another embodiment of the present invention.

As illustrated in FIGS. 1 and 2, the flat sheet membrane element 2 has a plurality of linearly or zonally extending recessed bonding portions 231 and 232 formed multiply along the periphery of the sheet filter membrane 22 and in a continuous groove shape along the outer periphery of the filter membrane 22. Although two recessed bonding portions 231 and 232 are formed in this example, three or more recessed bonding portions 23 may be provided as illustrated in FIG. 4.

In the present embodiment, the internal recessed bonding portion 231 is formed linearly and the external recessed bonding portion 232 is formed in a mesh shape extending zonally. Although the mesh pattern forms in square in this example, it may be in, for example, a triangular, circular, or elliptical shape. As illustrated in FIG. 4, all the recessed bonding portions 23 may be in a linear shape or another shape, for example, a wave shape.

Before the plurality of recessed bonding portions 23 are formed, the filter plate 21 forms a flat filter plate surface in an area to form the recessed bonding portions 23. The recessed bonding portions 231 and 232 are different in a distance from the surface of the filter membrane 22 arranged on the flat filter plate surface before welding to the surface of the filter membrane 22 at the bottom of the recessed bonding portions 231 and 232, that is, in depth between the internal recessed bonding portion 231 and the external recessed bonding portion 232. The internal recessed bonding portion 231 is formed with a deeper depth compared with the depth of the external recessed bonding portion 232. The depth of the internal recessed bonding portion 231 may be set at 0.7 mm at the maximum while the depth of the external recessed bonding portion 232 may be set at 0.4 mm at the maximum, where their difference is set between 0.05 mm and 0.5 mm.

If their difference is less than 0.05 mm, it becomes markedly less than the thickness of the filter membrane 22. This results in, as described in a method of producing the flat sheet membrane element 2 later, impairment of the effect of abutting projections 521 and 522 of a hot plate 51 on the filter membrane with different timing for each projection. The case where the difference between them is more than 0.5 mm is not preferable because the welding step takes excessive time and greater energy.

A deeper recessed bonding portion 23 has a greater welding area between the filter membrane 22 and the filter plate 21 per unit length in a direction along the outer peripheral shape of the filter membrane 22. In this embodiment, the welding area of the internal recessed bonding portion 231 is set greater than the welding area of the external mesh recessed bonding portion 232 extending zonally.

When the membrane separator 1 provided with the flat sheet membrane elements 2 is used in activated sludge process equipment, the membrane separator 1 is submerged in an activated sludge mixed liquid inside an aeration tank. While the aeration air is blown from the air diffusers 3, the organics and nitrogen in the untreated water are processed by the activated sludge. The activated sludge mixed liquid performs gravity filtration by the flat sheet membrane elements 2 using the water head in the tank as the driving pressure or suction filtration by additionally installing a suction pump to the permeate delivery pipe 9. The permeate that is permeated through the surfaces of the flat sheet membrane elements 2 is delivered outside the tank as treated water through the permeate delivery pipe 9.

At this point, bubbles of the aeration air blown from the air diffusers 3 and upward flows created by the bubbles flow through narrow channels (in a width from 5 to 10 mm) between the flat sheet membrane elements 2 adjacent to each other to clean the surfaces of the flat sheet membrane elements 2. A decrease in the separation function is thus inhibited to prevent malfunction of the membrane separator 1.

The flat sheet membrane element 2 in the present embodiment has the sheet filter membrane 22 pressed in the filter plate 21 in the recessed bonding portions 231 and 232 to be bonded to the filter plate 21 by heat welding. The filter membrane 22 and the surface of the filter plate 21 are thus in tight contact over the entire region of the filter membrane 22. Meanwhile, the external recessed bonding portion 232 in a mesh shape intermittently presses outer peripheral sides 25 of the filter membrane 22 in the filter plate 21 in the recessed bonding portion 232 for intermittent bonding to the filter plate 21. The outer peripheral sides 25 of the filter membrane 22 is thus extended and kept in tight contact with the filter plate surface without rising from the surface of the filter plate 21.

Accordingly, even when the flat sheet membrane element 2 is exposed to an upward flow associated with aeration in the treatment tank, vibration of the filter membrane 22 is inhibited, leading to inhibition of swelling of the filter membrane 22 from the filter plate 21 and sticking of the filter membrane 22 to the filter plate 21 that are caused by the vibration. The bending stress of the filter membrane 22 in the welded portions is reduced to inhibit the fatigue.

A description is given below to a method of producing the flat sheet membrane element 2. FIGS. 5 through 8 are A-A cross-sectional views in FIG. 2, illustrating a production procedure of the flat sheet membrane element 2.

Figure 5:
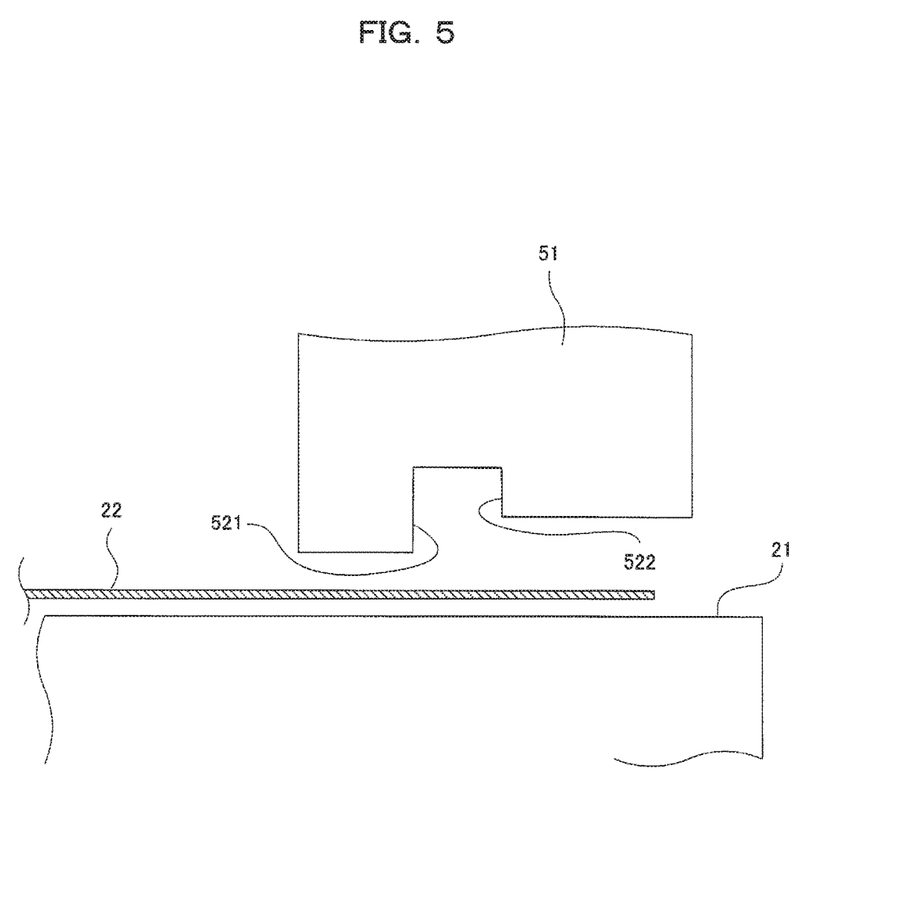
FIG. 5 is a first drawing illustrating a step in a method of producing a sheet membrane element of the present invention.

As illustrated in FIG. 5, the sheet filter membrane 22 is arranged on a surface of the filter plate 23. In the present embodiment, the filter plate 23 has a flat filter plate surface at least in an area corresponding to the periphery of the filter membrane 22 and thus has a simple filter plate structure.

A hot plate 51 is provided with a linear projection 521 and a zonally extending mesh projection 522. The plurality of projections 521 and 522 form continuous objects along the outer peripheral shape of the filter membrane 22 and are arranged multiply along the outer peripheral shape of the filter membrane 22. The projections 521 and 522 are formed at different levels, where the internal projection 521 is formed higher than the external projection 522 and has a shape with a greater pressing area of abutting on the filter membrane 22 per unit length in the direction along the outer peripheral shape of the filter membrane 22.

Figure 6:
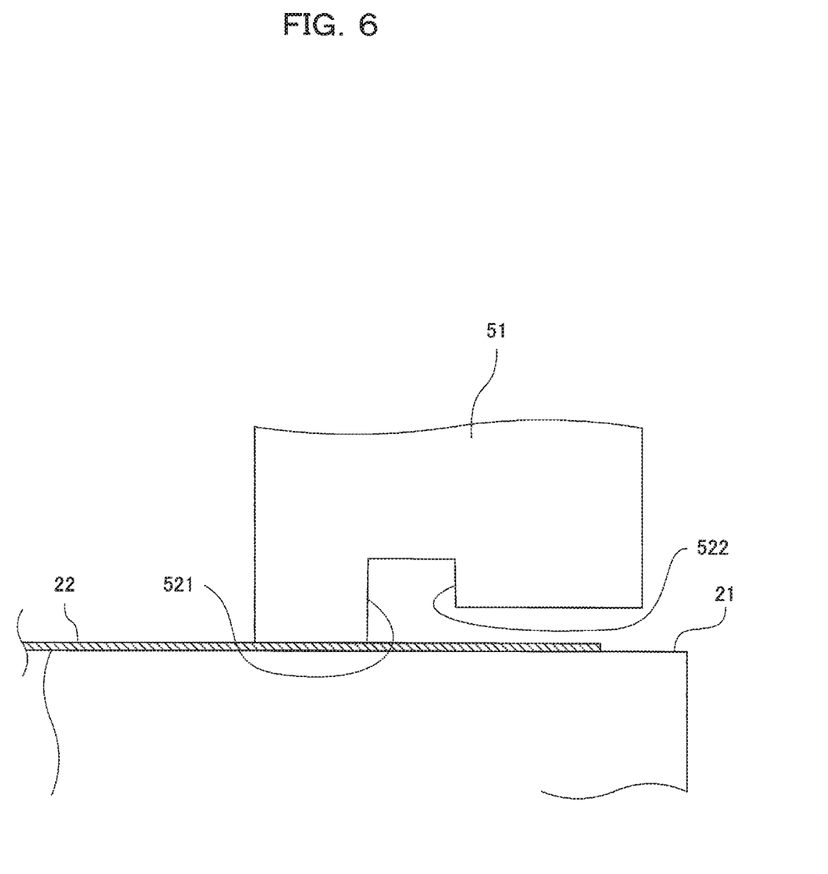
FIG. 6 is a second drawing illustrating a step in the method of producing a sheet membrane element of the present invention.

Then, as illustrated in FIG. 6, the hot plate 51 is lowered toward the filter membrane 22 to cause the higher internal projection 521 abut earlier on the filter membrane 22. The effective area for filtration of the filter membrane 22 is thus surrounded with the internal projection 521.

Figure 7:
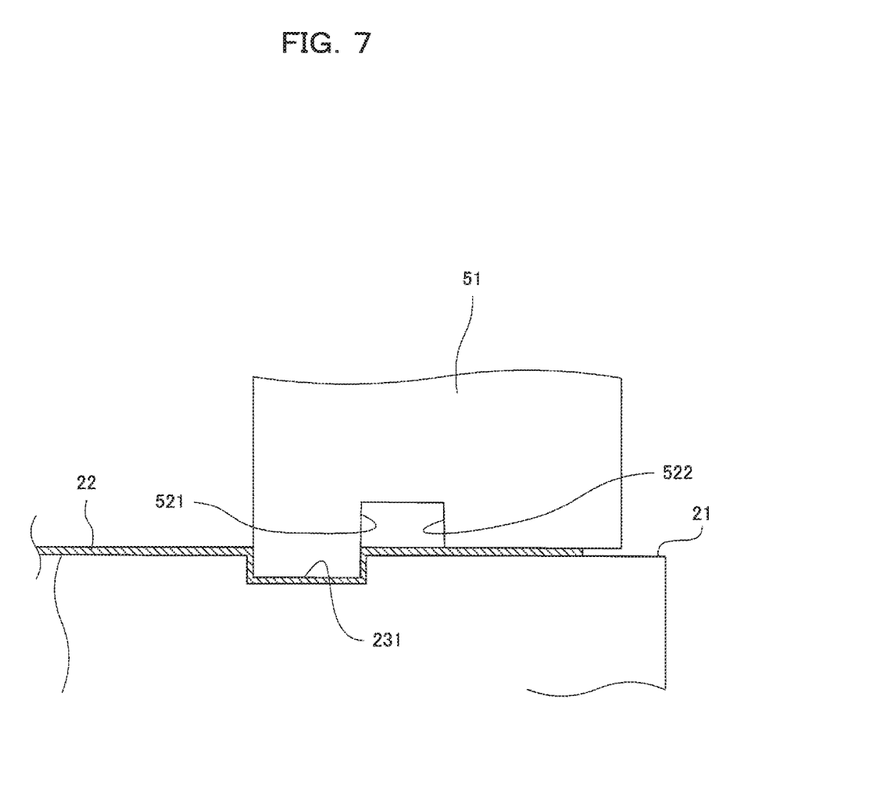
FIG. 7 is a third drawing illustrating a step in the method of producing a sheet membrane element of the present invention.

Then, as illustrated in FIG. 7, the hot plate 51 is further lowered toward the filter membrane 22 to press the higher internal projection 521 in the filter plate 21 in advance for a slight difference in height, which is approximately 0.2 mm, from the lower external projection 522. The effective area for filtration of the filter membrane 22 is thus kept in tension while the lower external projection 522 is caused to abut on the filter membrane 22 with delayed timing.

In other words, the projections 521 and 522 abut on the filter membrane 22 with different timing, and the filter membrane 22 is slightly pressed in the filter plate 21 only by the higher internal projection 521 while the external projection 522 does not abut on the filter membrane 22. This enables reduction in stress exerted on the filter membrane 22 during the press and stepwise increase in load exerted on the hot plate 51, thereby inhibiting a high load to be exerted on the hot plate 51 at a time and reducing the heat capacity and the power supply capacity of the hot plate 51.

In addition, the filter membrane 22 is slightly pressed in the filter plate 21 by the higher internal projection 521 in advance. This enables sealing between the filter membrane 22 and the filter plate 21 while the extended filter membrane 22 with no wrinkles is in tight contact with the filter plate 21. The internal recessed bonding portion 231 to be welded earlier is formed deeply to have a greater welding area between the filter membrane 22 and the filter plate 21 per unit length, thereby achieving secure sealability and secure bonding strength.

Figure 8:
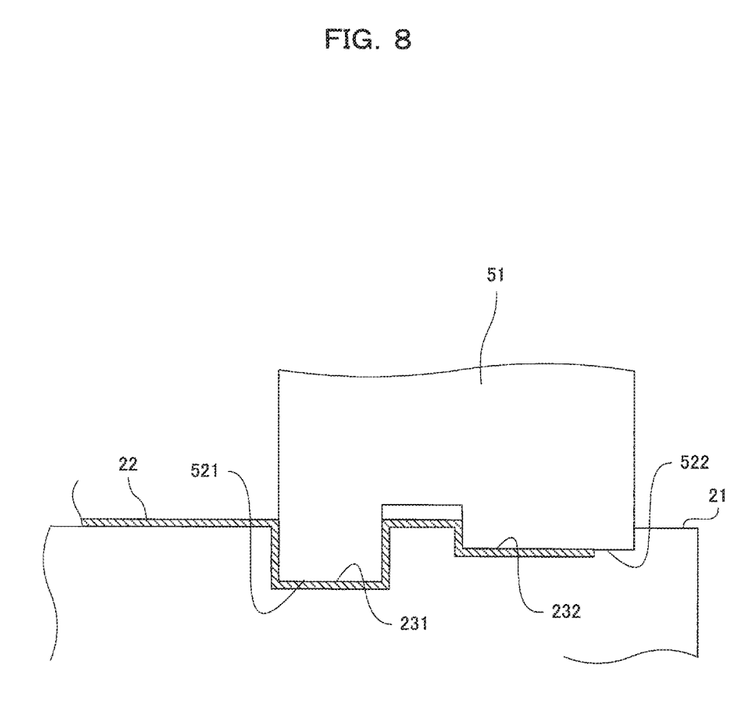
FIG. 8 is a fourth drawing illustrating a step in the method of producing a sheet membrane element of the present invention.

Then, as illustrated in FIG. 8, the periphery of the filter membrane 22 is multiply pressed by the entire projections 521 and 522. In the pressing operation, the filter membrane 22 is kept in tension by an appropriate drawing force using the internal projection 521 in advance. Then, while the tension is kept, both the projection 521 and the external projection 522 are simultaneously pressed in the filter plate 21 in one pressing operation. The pressing forms the plurality of recessed bonding portions 231 and 232 with different depths multiply along the periphery of the filter membrane 22 where the internal recessed bonding portion 231 is formed with a deeper depth compared with the depth of the external recessed bonding portion 232. The filter membrane 22 is thus bonded to the filter plate 21 by heat welding simultaneously in the plurality of recessed bonding portions 231 and 232 for sealing between the filter membrane 22 and the filter plate 21 along the periphery of the filter membrane 22.

In such a manner, the filter membrane 22 is bonded to the filter plate 21 simultaneously in the plurality of recessed bonding portions 231 and 232 in one operation of pressing the hot plate 51. This enables simplification of the bonding operation and prevention of excessive stress on the filter membrane 22.

The flat sheet membrane element 2 obtained by the above method is produced by pressing the sheet filter membrane 22 in the filter plate 21 by the projections 521 and 522 of the hot plate 51 to form the recessed bonding portions 231 and 232. The filter membrane 22 is then bonded to the filter plate 21 in tension by heat welding, thereby tightly contact the filter membrane 22 and the surface of the filter plate 21 over the entire region of the filter membrane 22.

Moreover, the above method enables welding of the filter membrane 22 to the filter plate 21 while the outer periphery of the filter membrane 22 is smoothly spread. In the present embodiment, the external recessed bonding portion 232 forms a mesh shape to intermittently press the outer peripheral sides of the filter membrane 22 in the recessed bonding portion 232 for bonding to the filter plate 21. The outer peripheral sides of the filter membrane 22 is thus extended and kept in tight contact with the filter plate surface of the filter plate 21 without rising from the filter plate surface.

As illustrated in FIG. 4, the recessed bonding portions 23 may be formed in the form of three lines. In this case, an outermost recessed bonding portion 233 may be formed with a wider width to absorb errors in dimensions and arrangement of the filter membrane and to be heat welded to the filter plate 21 over the entire outer peripheral sides of the filter membrane 22. This enables secure prevention of separation in the outer peripheral sides of the filter membrane 22.

Having described the invention, the following is claimed:

1. A flat sheet membrane element, comprising:
a filter plate composed of a thermoplastic resin;
a plurality of recessed bonding portions multiply formed on a surface along a periphery of the filter plate, wherein the plurality of recessed bonding portions comprise an internal recessed bonding portion and an external recessed bonding portion; and
a sheet filter membrane having a periphery pressed in and bonded to the filter plate by heat welding in the internal and external recessed bonding portions,
wherein each recessed bonding portion has a different depth from a surface of the filter membrane, such that the internal recessed bonding portion is formed with a deeper depth in the surface of the filter plate compared with a depth of the external recessed bonding portion, and
wherein the external recessed bonding portion is formed in a mesh pattern to intermittently press outer peripheral sides of the sheet filter membrane into the external recessed bonding portion for bonding to the filter plate.

2. The flat sheet membrane element according to claim 1, wherein the flat sheet membrane element has a welding area between the filter membrane and the filter plate per unit length of the internal and external recessed bonding portions, wherein said welding area is determined in accordance with the depth of the internal and external recessed bonding portions.

3. The flat sheet membrane element according to claim 1, wherein the mesh patter is in the form of a square, triangular, circular, or elliptical shape.

4. The flat sheet membrane element according to claim 1, wherein the internal and external recessed bonding portions are in a linear shape or a wave shape.

5. The flat sheet membrane element according to claim 1, wherein a difference in the depth of the internal recessed bonding portion as compared with the depth of the external recessed bonding portion is between 0.05 mm and 0.5 mm.

* * * * *